United States Patent

[11] 3,609,182

[72] Inventors James Albert Baker
5 Dove House Crescent, Farnham Royal, Slough, Buckinghamshire;
Robert Stevens, 7 Hurst Road, Slough, Buckinghamshire, both of England
[21] Appl. No. 688,335
[22] Filed Dec. 6, 1967
[45] Patented Sept. 28, 1971

[54] PRODUCTION OF CYCLOOCTYL FORMATE CYCLOOCTANOL AND CYCLOOCTANONE
7 Claims, No Drawings
[52] U.S. Cl. .................................................. 260/497 R,
260/488 R, 260/586 A, 260/617 R
[51] Int. Cl. ............................................................ C07c 45/16,
C07c 67/04, C07c 69/06
[50] Field of Search ............................................ 260/497,
488, 586 A

[56] References Cited
UNITED STATES PATENTS
3,128,304 4/1964 Lafont .......................... 260/497
OTHER REFERENCES
Chem. Abstracts, 48:1969 h (I); 52:12908a (II); 59:3786d (III)

Primary Examiner—Lewis Gotts
Assistant Examiner—Vivian Garney
Attorney—William Anthony Drucker ABSTRACT: A new route to the solvents and intermediates cyclooctanol and cyclooctanone via cyclooctyl formate is disclosed. Cyclooctyl formate may be made by acylating cyclooctene with formic acid, preferably without a catalyst, the better conversion and simplified procedure allowing the formate to be obtained at a fraction of the cost of the corresponding acetate.

PRODUCTION OF CYCLOOCTYL FORMATE CYCLOOCTANOL AND CYCLOOCTANONE

This invention relates to the production of cyclooctyl compounds, and is concerned more particularly with processes for making a cyclooctyl acylate, cyclooctanol and cyclooctanone.

According to the present invention there is provided a process for making a cycloalkane acylate which is characterized in that cyclooctene is reacted with formic acid. The reaction is effected in the liquid phase, and cyclooctyl formate is produced in accordance with the reaction scheme:

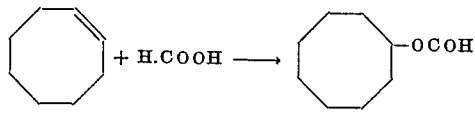

and may be recovered from the reaction system. The heterogeneous liquid phase is advantageously vigorously agitated, as by stirring.

According to a particularly preferred feature of the invention the reactants are reacted in the absence of a catalyst, for example an acidic catalyst, especially perchloric acid.

The reaction is preferably conducted at a temperature below the boiling point of formic acid (about 101° C. at standard pressure) and most advantageously below 85° C., regardless of the ambient pressure, which is conveniently normal pressure. Use of a temperature below 85° C. avoids any substantial loss of formic acid through decarbonylation and, furthermore, avoids the formation of water as a product of the decarbonylation of formic acid: hence unchanged formic acid may be separated from the reaction system, as by distillation, without substantial dilution by water, whereby such recovered formic acid may be reused as such in a further reaction. However, the temperature at which the reaction is carried out preferably exceeds 50° C.

The formic acid employed in the process of the reaction should be of a concentration which exceeds 90 percent w/w, that is to say its water content should be below 10 percent w/w. Preferably, formic acid of at least 95 percent w/w is employed. Most advantageously the formic acid is from 98 to 100 percent w/w.

Preferably, a molar excess of formic acid is employed. More advantageously, at least 2 moles of formic acid are employed per mole of cyclooctene. Most advantageously the formic acid is employed in a volume which is at least equal to the volume of cyclooctene employed, i.e. the formic acid is employed in at least a 2.4 molar excess.

Whereas the desired reaction proceeds well in accordance with the present invention when effected in the absence of a catalyst, the corresponding reaction employing acetic acid in place of formic acid to produce cyclooctyl acetate will not work in the absence of a catalyst, the presence of an acidic catalyst (such as sulfuric acid) being essential. Furthermore, the use of formic acid without a catalyst is greatly superior even to the use of acetic acid plus a catalyst. On the one hand a greatly improved yield of cyclooctyl acylate is obtainable. Furthermore, recovery of the formed acylate is much simpler and more economic. Thus the desired product may be recovered directly by distillation, whereas if perchloric acid had been present as a catalyst it would have been necessary either to neutralize it before distillation could be conducted, or to reduce its concentration very greatly by "drowning" the reaction mixture with water before recovery of the desired product, as would also be necessary if some such acid as sulfuric acid had been employed as catalyst. Such a step would greatly complicate the recovery both of the desired product and of the unconverted formic acid. Furthermore, the latter would have been recovered in a much diluted form which could not have been reused as such in a further reaction.

Additionally, avoidance of the use of a catalyst avoids catalyzing the formation of unwanted cyclooctyl cyclooctene which would otherwise take place to the disadvantage of the desired reaction.

It has been found that the use of the process of the invention enables the production of cyclooctyl formate at only a fraction of the cost (even before taking into account savings in labor charges) at which, on a mole-for-mole basis, cyclooctyl acetate may be produced by the Reppe process described in Annalen 560, 1–92 (1948), assuming that, that process gives, as described, a yield of about 30 percent after allowing for recovered cyclooctene. In fact, in our hands we have been unable in several attempts at repeating the process as there described to achieve conversions anywhere near as high as that disclosed. The magnitude of the economic improvement obtainable by acylating cyclooctene with formic acid instead of acetic acid greatly exceeds anything that might be predicted by comparing the effects of acylating cyclohexene with acetic acid on the one hand and with formic acid on the other hand. Furthermore, as described below, cyclooctyl formate is a more convenient intermediate than cyclooctyl acetate for the production of cyclooctanol.

The cyclooctyl formate produced by the process of the present invention may readily be recovered from the reaction system by fractional distillation. The first fraction will be any unchanged formic acid, which may be reused. The second fraction will be any unchanged cyclooctene (boiling point about 140° C. at standard pressure) which may also be reused. The third fraction will be the desired cyclooctyl formate (boiling point exceeding 200° C. at standard pressure). Distillation of the formic acid fraction is preferably effected at a reduced pressure to minimize or prevent decarbonylation thereof with consequent dilution of the recovered formic acid with water; the reduced pressure is advantageously such as to reduce the boiling point of the formic acid to below 80° C. Distillation of the cyclooctyl formate fraction is preferably effected at a reduced pressure such that the boiling point thereof is reduced to about 100° C. or less, whereby distillation may be effected by heating the still externally by means of stem. Most advantageously, all said fractions are distilled under a reduced pressure such as to secure the objectives mentioned above.

In an alternative procedure for recovering the formed cyclooctyl formate from the reaction system the heterogeneous liquid phase reaction medium is allowed to separate into two layers. The upper layer (which contains about two-thirds of the cyclooctyl formate produced, in the case in which equal volumes of cyclooctene and formic acid are employed) is then decanted and distilled to recover the desired ester. The lower layer may be reused in a subsequent batch.

This alternative procedure may also be adapted to continuous production by continuously separating a proportion of the upper layer from a reaction vessel in which continuous esterification is being conducted. This decanted upper layer material is fed to an appropriate point in a fractionating column intermediate its ends, the column being maintained at a temperature such that unreacted cyclooctene and any formic acid in the upper layer are distilled up the column, whence they may be condensed and returned to the reaction vessel, while the cyclooctyl formate condenses and may be recovered from a lower point in the column and collected. Fresh cyclooctene and formic acid are added to the reaction vessel as required to make good the material which has been converted and recovered. To minimize or prevent decarbonylation of the formic acid the entire system is advantageously run at a reduced pressure such that fractionation may be conducted at a temperature below 85° C., and preferably below 80° C.

Cyclooctyl formate, a new compound forming a part of this invention, may, if desired, readily be converted to cyclooctanol by hydrolysis of the acyl group by a method known per se, such as the action of a base, advantageously an alkali metal hydroxide such as sodium hydroxide. This route to cyclooctanol has the advantage over the hydrolysis of cyclooctyl acetate that it may be effected by means of an aqueous solution of an alkali whereas the latter route requires the use of an alcoholic solution of an alkali metal hydroxide.

Accordingly, the present invention also provides a process for making cyclooctanol which comprises hydrolyzing the acyl group of cylooctyl formate by a method known per se, preferably by the action of an aqueous solution of an alkali metal hydroxide, desirably sodium hydroxide.

Cyclooctanol so obtained may, if desired, readily be converted to cyclooctanone by oxidation of the hydroxyl group to a keto group by a method known per se, such as by the action of chromic acid. Alternatively, cyclooctyl formate of the present invention may, if desired, be converted in a single step to cyclooctanone by oxidation of the formate group to a keto group by a method known per se, for example by the action of chromic acid. This avoids the use of the hydrolysis step but requires the use of 50 percent more chromic acid.

Accordingly, the present invention also provides a process for making cyclooctanone which comprises oxidizing the formate group of cyclooctyl formate to a keto group by a method known per se, preferably by the action of chromic acid.

The following examples further illustrate the invention:

Example 1

Eleven hundred grams (1,300 ml.) cyclooctene and 1,300 ml. 98 percent w/w formic acid were heated at 80° C. with stirring in a 5-l. round-bottomed flask for 8 hours. The excess formic acid and cyclooctene were removed by distillation at 200-mm. pressure. Eleven hundred and fifty milliliters of formic acid and 675 g. (795 ml.) cyclooctene were recovered. The residue was distilled at 34-mm. pressure giving 494 g. cyclooctyl formate, a colorless liquid with a fruity odor, b.p. 117° C. at 34 mm.

Found: C, 70.8%; H, 10.78%. Calculated: C, 69.3%; H, 10.26%. I.R. spectrum (between salts) shows peaks at 2,950, 1,710, 1,460, 1,440, 1,370, 1,180 (broad), 1,115, 1,085, 1,045, 945, 905, 870, 830, 790, 754 cm$^{11}$.

Yield 82 percent based on cyclooctene consumed.

Example 2

Fifty milliliters cyclooctene, 50 ml. 98 percent w/w formic acid and 0.5 ml. 70 percent w/w aqueous perchloric acid were heated at 80° C. with stirring for 6 hours. Thereafter, the mixture was allowed to separate into two layers, and the upper layer was removed and fractionally distilled under reduced pressure, giving 6.7 g. cyclooctene, 7.8 g. cyclooctyl formate, 16.4 g. of a high boiling liquid (b.p. 98° C./0.6 mm.) and 8.3 g. residue.

Example 3

Five hundred grams cyclooctene and 800 ml. 98 percent w/w formic acid were heated under reflux with rapid stirring for 45 hours (125° C. (+)). The mixture was poured into a large excess of water, and the oily phase which separated was washed with aqueous $Na_2CO_3$ solution, then with aqueous NaCl solution, and finally dried over $MgSO_4$. Five hundred grams solution of clear yellow liquid were obtained which on distillation under reduced pressure yielded 117 g. cyclooctene, 142 g. cyclooctyl formate and 237 g. residue.

Example 4

Six Kilograms of 98 percent w/w formic acid and 6.0 kg. of cyclooctene were heated at 80° C. for 8 hours, the mixture being well stirred. The mixture was then allowed to cool overnight and to separate into two layers. The bottom (formic acid) layer was run off into 3.3 kg. of cyclooctene in a 20-1. separating funnel. The mixture was shaken for about 5 minutes and then allowed to separate into the layers, the top layer being added to the upper (cyclooctene, etc.) layer remaining in the reaction flask. The excess cyclooctene was then distilled off, followed by 2.1 kg. of cyclooctyl formate.

Example 5

6.41 kg. of cyclooctyl formate and 2 kg. sodium hydroxide in 6 l. water were heated at 85° C.–100° C. for about 2 hours, the mixture being well stirred. It was then allowed to cool and separate into two layers. The upper (organic) layer containing cyclooctanol resulting from the hydrolysis of the ester was removed and dissolved in 20 l. acetone. To the acetone solution was then added slowly a mixture of approximately 5.6 kg. chromium trioxide, 4.9 l. concentrated sulfuric acid and 15 l. water, while cooling in a water bath. When the oxidation of the cyclooctanol was complete the acetone solution was decanted from the chromic sulfate sludge, the acetone stripped off and the residue poured into a large volume of water. The organic layer was separated, dried over $MgSO_4$ and distilled at 116° C. /60 mm. yielding 4.24 kg. of cyclooctanone (82 percent of theory).

Example 6

Seventy-eight grams of cyclooctyl formate were dissolved in 250 ml. acetone and a Jones reagent (made from 67 g. chromium trioxide, 58 ml. conc. sulfuric acid and 150 ml. water) added slowly, while cooling the mixture, until the oxidation was complete. The liquor was decanted, the acetone stripped off, and the residue poured into a large volume of water, the organic layer being separated and dried over $MgSO_4$, then distilled at 86° C. /12 mm., yielding 43 g. (70 percent of theory) of cyclooctanone.

Having regard to the foregoing disclosure, the following is claimed as the inventive and patentable embodiments thereof:

1. A process for making a compound of the formula:

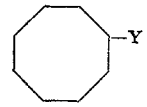

wherein Y is —OCOH, which comprises the step of reacting cyclooctene with formic acid in liquid phase, said formic acid containing less than 10 percent w/w of water, under vigorous agitation at a temperature below 85° C. to produce cyclooctyl formate.

2. A process as claimed in claim 1, wherein the reaction is effected in the absence of a catalyst.

3. A process as claimed in claim 1, wherein the reaction medium employed contains at least 2 moles of formic acid per mole of cyclooctene.

4. A process as claimed in claim 1, wherein the cyclooctyl formate is saponified to cyclooctanol.

5. A process as claimed in claim 4, wherein saponification is effected by the action of an aqueous solution of an alkali metal hydroxide.

6. A process as claimed in claim 4, wherein the cyclooctanol is oxidized to cyclooctanone.

7. A process as claimed in claim 1, wherein the cyclooctyl formate is oxidized to cyclooctanone.